(12) United States Patent
Zong et al.

(10) Patent No.: US 12,143,201 B2
(45) Date of Patent: Nov. 12, 2024

(54) RECONFIGURABLE OPTICAL ADD/DROP MULTIPLEXER

(71) Applicant: HUAWEI TECHNOLOGIES CO., LTD., Guangdong (CN)

(72) Inventors: Liangjia Zong, Dongguan (CN); Gangxiang Shen, Suzhou (CN); Yongcheng Li, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 17/901,657

(22) Filed: Sep. 1, 2022

(65) Prior Publication Data

US 2022/0416931 A1 Dec. 29, 2022

Related U.S. Application Data

(63) Continuation of application No. PCT/CN2021/079188, filed on Mar. 5, 2021.

(30) Foreign Application Priority Data

Mar. 6, 2020 (CN) .......................... 202010153583.7

(51) Int. Cl.
*H04J 14/02* (2006.01)
*H04B 10/272* (2013.01)

(52) U.S. Cl.
CPC ........ *H04J 14/0212* (2013.01); *H04B 10/272* (2013.01); *H04J 14/0213* (2013.01)

(58) Field of Classification Search
None
See application file for complete search history.

(56) References Cited

U.S. PATENT DOCUMENTS

| 10,536,236 B2 | 1/2020 | Younce et al. |
| 2003/0169989 A1* | 9/2003 | Abel ........................ C09D 4/06 385/128 |

(Continued)

FOREIGN PATENT DOCUMENTS

| CN | 102696194 A | 9/2012 |
| CN | 104350698 A | 2/2015 |

(Continued)

OTHER PUBLICATIONS

Zhong, "Colorless, Directionless, and Partially Contentionless (CDpC) ROADM: A New Architecture for the Best Performance to Cost Ratio", 2019 Asia Communications and Photonics Conference (ACP), Chengdu, China, 2019, pp. 1-3. (Year: 2019).*

(Continued)

*Primary Examiner* — Darren E Wolf
(74) *Attorney, Agent, or Firm* — Fish & Richardson P.C.

(57) ABSTRACT

An example reconfigurable optical add/drop multiplexer includes: optical fibers, X first wavelength selective switches, and Y wavelength add/drop modules. The X first wavelength selective switches correspond to W directions. The W directions include a first direction and a second direction. The first direction corresponds to P first wavelength selective switches among the X first wavelength selective switches. The second direction corresponds to Q first wavelength selective switches among the X first wavelength selective switches, where P+Q is less than or equal to X. A first wavelength add/drop module is connected to A of the P first wavelength selective switches by using one or more first optical fibers, and connected to B of the Q first wavelength selective switches by using one or more second optical fibers, where the first wavelength add/drop module is one of the Y wavelength add/drop modules, A is less than P.

20 Claims, 12 Drawing Sheets

(56) References Cited

U.S. PATENT DOCUMENTS

| | | | |
|---|---|---|---|
| 2009/0232497 A1* | 9/2009 | Archambault | H04J 14/0217 398/50 |
| 2010/0142961 A1 | 6/2010 | Wisseman | |
| 2013/0223794 A1* | 8/2013 | Boduch | H04J 14/0208 385/24 |
| 2013/0236175 A1* | 9/2013 | Sethumadhavan | G02B 6/29383 398/43 |
| 2016/0149663 A1* | 5/2016 | Ji | H04J 14/0216 398/48 |
| 2016/0191191 A1 | 6/2016 | Mitchell | |
| 2019/0261070 A1 | 8/2019 | Martinho et al. | |

FOREIGN PATENT DOCUMENTS

| | | |
|---|---|---|
| CN | 104734799 A | 6/2015 |
| CN | 110620964 A | 12/2019 |
| EP | 3166243 A1 | 5/2017 |

OTHER PUBLICATIONS

Office Action in Chinese Appln. No. 202010153583.7, dated Jul. 19, 2022, 14 pages (with English translation).

International Search Report and Written Opinion in International Appln. No. PCT/CN2021/079188, mailed on May 24, 2021, 16 pages (with English translation).

Zhong et al., "Colorless, Directionless, and Partially Contentionless (CDpC) ROADM: a New Architecture for the Best Performance to Cost Ratio (Invited)," 2019 Asia Communications and Photonics Conference (ACP) OSA, Nov. 2, 2019, 3 pages.

Extended European Search Report in European Appln No. 21763986. 3, dated Jun. 30, 2023, 10 pages.

Office Action in Russian Appln. No. 2022125408/07, mailed on Jul. 5, 2024, 16 pages (with English translation).

* cited by examiner

RECONFIGURABLE OPTICAL ADD/DROP MULTIPLEXER

CROSS-REFERENCE TO RELATED APPLICATIONS

This application is a continuation of International Application No. PCT/CN2021/079188, filed on Mar. 5, 2021, which claims priority to Chinese Patent Application No. 202010153583.7, filed on Mar. 6, 2020. The disclosures of the aforementioned applications are hereby incorporated by reference in their entireties.

TECHNICAL FIELD

Embodiments of this application relate to the field of communications technologies, and in particular, to a reconfigurable optical add/drop multiplexer.

BACKGROUND

A reconfigurable optical add/drop multiplexer (ROADM) is a node device in an optical fiber communications network. A basic function of the reconfigurable optical add/drop multiplexer is to complete, in real time, adding/dropping of optical signals of selected wavelengths by performing remote configuration, to improve flexibility of scheduling optical signals by a wavelength division multiplexing (WDM) network.

Currently, the ROADM is mainly formed by a combination of wavelength selective switches (WSS). A WSS selects and schedules an optical signal based on a wavelength. As shown in FIG. 1, in an existing ROADM, any M×N WSS serving as a wavelength add/drop module is connected to any 1×K WSS in any direction.

Therefore, as K increases, a quantity M of ports of the M×N WSS increases sharply. Consequently, performance of the M×N WSS is degraded.

SUMMARY

Embodiments of this application provide a reconfigurable optical add/drop multiplexer, to improve performance of a wavelength add/drop module.

A first aspect of the embodiments of this application provides a reconfigurable optical add/drop multiplexer, including optical fibers, X first wavelength selective switches, and Y wavelength add/drop modules, where the X first wavelength selective switches correspond to W directions, the wavelength add/drop modules may be wavelength selective switches, both X and W are integers greater than 1, and Y is a positive integer;

the W directions include a first direction and a second direction; in addition, the W directions may further include other directions;

the first direction corresponds to P first wavelength selective switches among the X first wavelength selective switches, where P is an integer greater than 1;

the second direction corresponds to Q first wavelength selective switches among the X first wavelength selective switches, where Q is a positive integer, and P+Q is less than or equal to X; and as one of the Y wavelength add/drop modules, a first wavelength add/drop module is connected to A of the P first wavelength selective switches by using the optical fibers, and connected to B of the Q first wavelength selective switches by using the optical fibers, where A is a positive integer less than P, and B is a positive integer less than or equal to Q.

Because A is less than P, the first wavelength add/drop module is connected only to a part of the first wavelength selective switches corresponding to the first direction. Therefore, a quantity of ports of the first wavelength add/drop module can be reduced, and performance of the wavelength add/drop module is improved.

Based on the first aspect, the embodiments of this application provide a first implementation of the first aspect. In this implementation, P is equal to Q, and A is equal to B.

In this implementation, because a quantity of first wavelength selective switches corresponding to the first direction is equal to a quantity of first wavelength selective switches corresponding to the second direction, A is equal to B, and even allocation of ports of the first wavelength add/drop module in the first direction and the second direction is ensured.

Based on the first aspect, the embodiments of this application provide a second implementation of the first aspect. In this implementation, P is greater than Q, and A is greater than or equal to B.

In this implementation, because a quantity of first wavelength selective switches corresponding to the first direction is greater than a quantity of first wavelength selective switches corresponding to the second direction, a quantity of first wavelength selective switches connected to the first wavelength add/drop module among the P first wavelength selective switches is greater than or equal to a quantity of first wavelength selective switches connected to the first wavelength add/drop module among the Q first wavelength selective switches, so that a quantity of ports corresponding to each direction increases as a quantity of first wavelength add/drop modules increases.

Based on the first aspect, or the first implementation of the first aspect, or the second implementation of the first aspect, the embodiments of this application provide a third implementation of the first aspect. In this implementation, Y is greater than 1, and any one of the P first wavelength selective switches is connected to at least one of the Y wavelength add/drop modules by using the optical fiber.

In this implementation, because each of the P first wavelength selective switches is connected to a wavelength add/drop module, it is ensured that the Y wavelength add/drop modules can receive signals from any first wavelength selective switch corresponding to the first direction.

Based on the third implementation of the first aspect, the embodiments of this application provide a fourth implementation of the first aspect. In this implementation, the Y wavelength add/drop modules further include a second wavelength add/drop module; and among the P first wavelength selective switches, a quantity of first wavelength selective switches connected to the first wavelength add/drop module is equal to a quantity of first wavelength selective switches connected to the second wavelength add/drop module.

Based on the third implementation of the first aspect or the fourth implementation of the first aspect, the embodiments of this application provide a fifth implementation of the first aspect, where a quantity of wavelength add/drop modules connected to each of the P first wavelength selective switches is the same.

In this implementation, it may be ensured that a quantity of first wavelength selective switches connected to each wavelength add/drop module among the P first wavelength selective switches is the same, and it may also be ensured that the quantity of wavelength add/drop modules connected to each of the P first wavelength selective switches is the same. When the foregoing two cases are both met, it is ensured that ports of the first wavelength add/drop module are evenly allocated among the P first wavelength selective switches.

Based on the first aspect, or the first implementation of the first aspect, or the second implementation of the first aspect, or the third implementation of the first aspect, or the fourth implementation of the first aspect, or the fifth implementation of the first aspect, the embodiments of this application provide a sixth implementation of the first aspect. In this implementation, Q is greater than 1, Y is greater than 1, and any one of the Q first wavelength selective switches is connected to at least one of the Y wavelength add/drop modules by using the optical fiber.

In this implementation, because each of the Q first wavelength selective switches is connected to a wavelength add/drop module, it is ensured that the Y wavelength add/drop modules can receive signals from any first wavelength selective switch corresponding to the second direction.

Based on the sixth implementation of the first aspect, the embodiments of this application provide a seventh implementation of the first aspect. In this implementation, the Y wavelength add/drop modules further include a third wavelength add/drop module; and among the Q first wavelength selective switches, the quantity of first wavelength selective switches connected to the first wavelength add/drop module is equal to a quantity of first wavelength selective switches connected to the third wavelength add/drop module.

Based on the seventh implementation of the first aspect, the embodiments of this application provide an eighth implementation of the first aspect. In this implementation, a quantity of wavelength add/drop modules connected to each of the Q first wavelength selective switches is the same.

In this implementation, it may be ensured that a quantity of first wavelength selective switches connected to each wavelength add/drop module among the Q first wavelength selective switches is the same, and it may also be ensured that the quantity of wavelength add/drop modules connected to each of the Q first wavelength selective switches is the same. When the foregoing two cases are both met, it is ensured that ports of the first wavelength add/drop module are evenly allocated among the Q first wavelength selective switches.

Based on the first aspect, or the first implementation of the first aspect, or the second implementation of the first aspect, or the third implementation of the first aspect, or the fourth implementation of the first aspect, or the fifth implementation of the first aspect, or the sixth implementation of the first aspect, or the seventh implementation of the first aspect, or the eighth implementation of the first aspect, the embodiments of this application provide a ninth implementation of the first aspect. In this implementation, one first port is disposed on a first side of the first wavelength selective switch, and K second ports are disposed on a second side of the first wavelength selective switch, where K is an integer greater than 1;

M third ports are disposed on a first side of the first wavelength add/drop module, and N fourth ports are disposed on a second side of the first wavelength add/drop module, where both M and N are positive integers greater than 1;

A third ports in the first wavelength add/drop module are connected to second ports of the A first wavelength selective switches among the P first wavelength selective switches by using the optical fibers, and connected to second ports of the B first wavelength selective switches among the Q first wavelength selective switches by using the optical fibers; and the first port is configured to receive signals, and the N fourth ports are configured to upload or download signals.

This implementation provides a feasible solution to connecting the wavelength add/drop module and the first wavelength selective switch.

Based on the ninth implementation of the first aspect, the embodiments of this application provide a tenth implementation of the first aspect. In this implementation, each of the first ports of the P first wavelength selective switches is connected to one single-core single-mode optical fiber.

In this implementation, a first input port is connected to one single-core single-mode optical fiber, so that the reconfigurable optical add/drop multiplexer transmits signals by using a plurality of single-core single-mode optical fibers.

Based on the ninth implementation of the first aspect, the embodiments of this application provide an eleventh implementation of the first aspect. In this implementation, the first ports of the P first wavelength selective switches are respectively connected to P output ports on a first side of a demultiplexer; and an input port on a second side of the demultiplexer is connected to a space division multiplexing optical fiber, where the space division multiplexing optical fiber may include a multi-core optical fiber or a multi-mode optical fiber.

The implementation can be applied to a space division multiplexing scenario. In the space division multiplexing scenario, the reconfigurable optical add/drop multiplexer is connected to a reconfigurable optical add/drop multiplexer at a peer end by using a space division multiplexing optical fiber, and the demultiplexer separately outputs a plurality of signals in the space division multiplexing optical fiber to each first wavelength selective switch.

A second aspect of the embodiments of this application provides a communications system, where the system includes a first reconfigurable optical add/drop multiplexer and a second reconfigurable optical add/drop multiplexer, where the first reconfigurable optical add/drop multiplexer may be the reconfigurable optical add/drop multiplexer in the first aspect of the embodiments of this application;

the second reconfigurable optical add/drop multiplexer also includes P first wavelength selective switches; and first ports of the P first wavelength selective switches in the second reconfigurable optical add/drop multiplexer are connected to first ports of P first wavelength selective switches in the first reconfigurable optical add/drop multiplexer in a one-to-one correspondence by using single-core single-mode optical fibers.

A third aspect of the embodiments of this application provides a communications system, where the system includes a multiplexer, a demultiplexer, a first reconfigurable optical add/drop multiplexer, and a second reconfigurable optical add/drop multiplexer, where the first reconfigurable optical add/drop multiplexer may be the reconfigurable optical add/drop multiplexer in the first aspect of the embodiments of this application;

the second reconfigurable optical add/drop multiplexer also includes P first wavelength selective switches;

first ports of P first wavelength selective switches in the first reconfigurable optical add/drop multiplexer are connected to P fifth ports on a first side of the demultiplexer;

first ports of the P first wavelength selective switches in the second reconfigurable optical add/drop multiplexer are connected to P seventh ports on a first side of the multiplexer; and an eighth port on a second side of the multiplexer is connected to a sixth port on a second side of the demultiplexer by using a space division multiplexing optical fiber.

A fourth aspect of the embodiments of this application provides an optical switching device, including an optical transceiver module and the reconfigurable optical add/drop multiplexer according to any implementation of the first aspect of the embodiments of this application, where the optical transceiver module is connected to a wavelength add/drop module in the reconfigurable optical add/drop multiplexer, and configured to perform conversion between an optical signal and an electrical signal.

It can be learned from the foregoing technical solutions that the embodiments of this application have the following advantages:

The first direction corresponds to the P first wavelength selective switches among the X first wavelength selective switches, and the second direction corresponds to the Q first wavelength selective switches among the X first wavelength selective switches, where P is an integer greater than 1, P is less than or equal to X, Q is a positive integer, and P+Q is less than or equal to X. As one of the Y wavelength add/drop modules, the first wavelength add/drop module is connected to at least A of the P first wavelength selective switches by using the optical fibers, and connected to B of the Q first wavelength selective switches by using the optical fibers. Because A is less than P, the first wavelength add/drop module is connected only to a part of the first wavelength selective switches corresponding to the first direction. Therefore, the quantity of ports of the first wavelength add/drop module can be reduced, and performance of the wavelength add/drop module is improved.

DESCRIPTION OF EMBODIMENTS

Embodiments of this application provide a reconfigurable optical add/drop multiplexer, to improve performance of a wavelength add/drop module.

Figure 1:
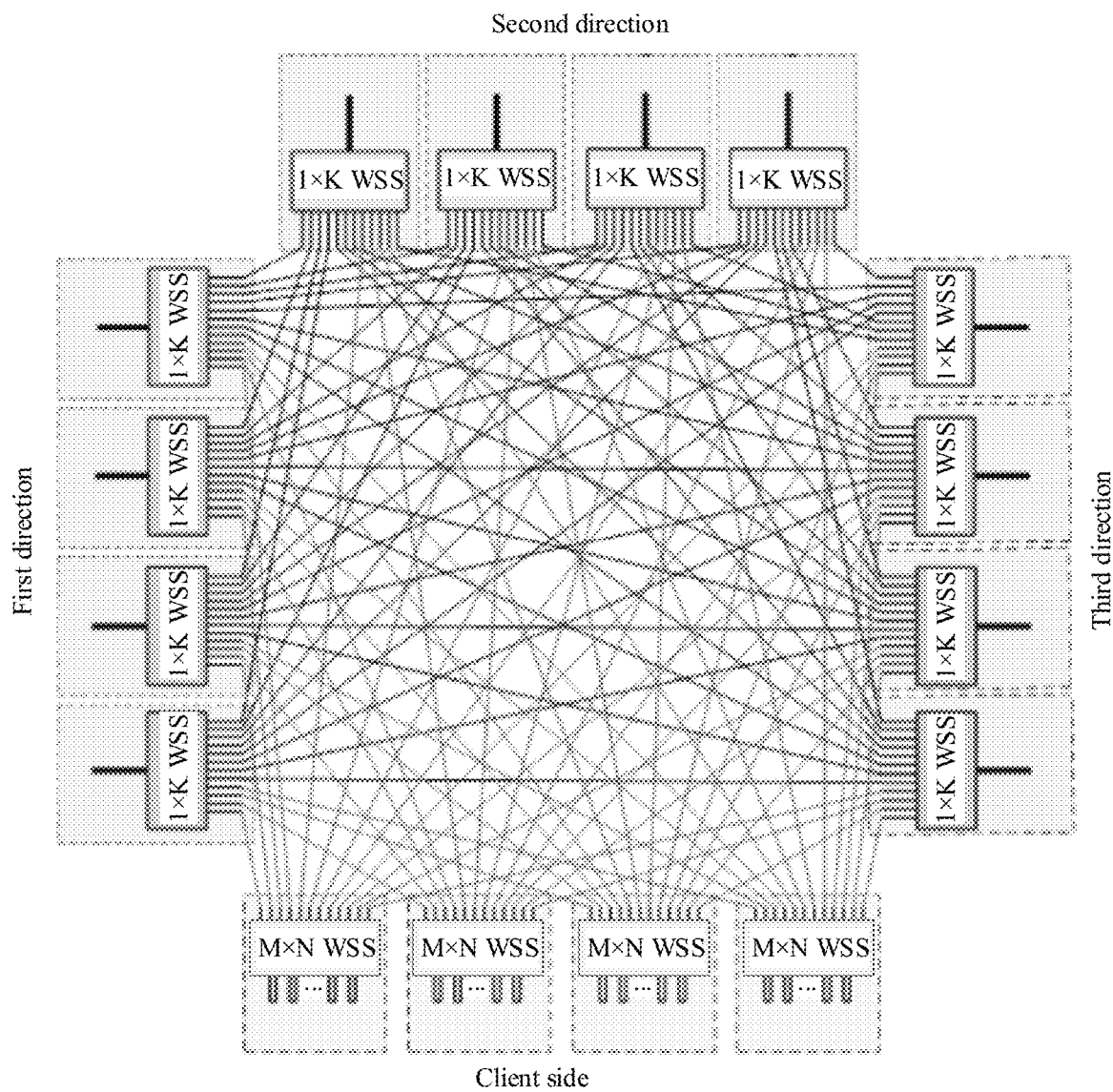
FIG. 1 is a schematic diagram of an architecture of a reconfigurable optical add/drop multiplexer in the conventional technology.

First, an architecture of a reconfigurable optical add/drop multiplexer is described with reference to FIG. 1. The reconfigurable optical add/drop multiplexer includes a 1×K wavelength selective switch (WSS) on a line side and a wavelength add/drop module on a client side, where the wavelength add/drop module is connected to the wavelength selective switch. In FIG. 1, the wavelength add/drop module is an M×N wavelength selective switch, configured to download or upload signals, where each of 1, K, M, and N indicates a quantity of ports.

During signal downloading based on the wavelength add/drop module, the wavelength selective switch first receives a signal from the line side, and then transmits the received signal to the wavelength add/drop module. Finally, the wavelength add/drop module outputs the signal from the wavelength selective switch to the client side to complete signal downloading.

During signal uploading based on the wavelength add/drop module, the wavelength add/drop module transmits a signal from the client side to the wavelength selective switch, and then the wavelength selective switch transmits the signal from the wavelength add/drop module to the line side, to complete signal uploading.

As can be learned from FIG. 1, the wavelength selective switch corresponds to a first direction, a second direction, and a third direction, and any wavelength add/drop module is connected to a wavelength selective switch in any direction. It may be understood that if a quantity of wavelength selective switches is larger, the wavelength add/drop module needs to be connected to more wavelength selective switches, and this eventually makes a quantity of ports of the wavelength add/drop module excessively large and increases an insertion loss, a volume, and costs of the wavelength add/drop module. Therefore, the embodiments of this application provide a reconfigurable optical add/drop multiplexer, where the reconfigurable optical add/drop multiplexer can reduce an insertion loss, a volume, and costs of a wavelength add/drop module.

Figure 2:
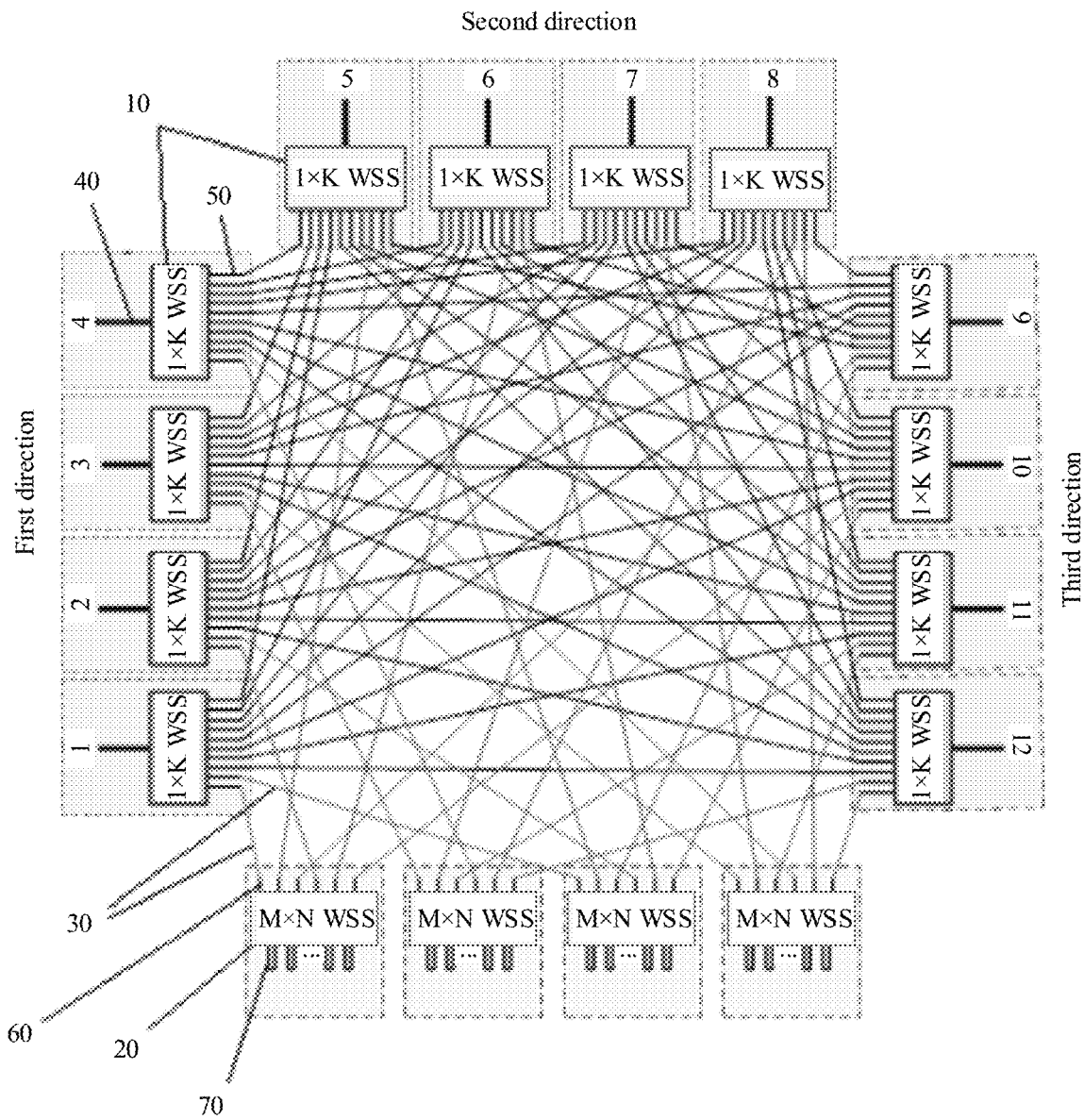
FIG. 2 is a schematic diagram of an architecture of a first embodiment of a reconfigurable optical add/drop multiplexer according to an embodiment of this application.

The reconfigurable optical add/drop multiplexer in the embodiments of this application is hereinafter described with reference to FIG. 2. As shown in FIG. 2, an embodiment of this application provides an embodiment of a reconfigurable optical add/drop multiplexer, including optical fibers 30, X first wavelength selective switches 10 on a line side, and Y wavelength add/drop modules on a client side, where the X first wavelength selective switches 10 correspond to W directions, both X and W are integers greater than 1, and Y is a positive integer.

It should be noted that, under a prerequisite that X is an integer greater than 1 and that Y is a positive integer, neither the quantity X of the first wavelength selective switches 10 nor the quantity Y of the wavelength add/drop modules is specifically limited in this embodiment of this application. Both the quantity X of the first wavelength selective switches 10 and the quantity Y of the wavelength add/drop modules may be adjusted based on an actual requirement.

For example, a scale of the first wavelength selective switch 10 may be 1×K, which specifically means that one first port 40 is disposed on a first side of the first wavelength selective switch 10, and that K second ports 50 are disposed on a second side of the first wavelength selective switch 10, where K is an integer greater than 1.

There may be a plurality of choices of values for K. In addition, values of K corresponding to any two of the X first wavelength selective switches 10 may be the same or different.

For example, the reconfigurable optical add/drop multiplexer shown in FIG. 2 is used as an example. The reconfigurable optical add/drop multiplexer includes 12 first wavelength selective switches 10, and each first wavelength selective switch 10 includes one first port 40 and 10 second ports 50.

The first port 40 may be connected to another reconfigurable optical add/drop multiplexer at a peer end by using an optical fiber 30. There are a plurality of connection manners. The connection manners are not limited in this embodiment of this application. Based on this, the first port 40 may input or output a wavelength division multiplexing signal by using the optical fiber 30.

It should be noted that the wavelength division multiplexing signal may be a combined signal of a plurality of wavelengths. The 1×K first wavelength selective switch 10 may randomly combine a plurality of wavelengths of the wavelength division multiplexing signal in the first port 40, and then output a combined signal to any one of the K second ports 50; or may randomly combine wavelengths of signals in the K second ports 50, and then output a combined signal to the first port 40.

For example, a first wavelength add/drop module 20 may be an M×N wavelength selective switch, where M×N indicates that M third ports 60 are disposed on a first side of the first wavelength add/drop module 20, N fourth ports 70 are disposed on a second side of the first wavelength add/drop module 20, the N fourth ports 70 are configured to upload or download signals, both M and N are positive integers greater than 1, and the first wavelength add/drop module 20 is one of the Y wavelength add/drop modules.

There may be a plurality of choices of values for both M and N. The values are not limited in this embodiment of this application. In addition, when Y is greater than 1, values of M corresponding to any two of the Y wavelength add/drop modules may be the same or different, and values of N corresponding to any two of the Y wavelength add/drop modules may be the same or different. In addition, the quantity Y of the wavelength add/drop modules may be adjusted based on an actual requirement.

For example, the reconfigurable optical add/drop multiplexer shown in FIG. 2 is used as an example. The reconfigurable optical add/drop multiplexer includes four wavelength add/drop modules, and each wavelength add/drop module includes six third ports 60.

In this embodiment of this application, the wavelength add/drop module is configured to upload or download signals. During signal uploading based on the wavelength add/drop module, the wavelength add/drop module randomly combines wavelengths of single-wavelength signals input by the N fourth ports 70, and outputs combined wavelength signals to the M third ports 60. During signal downloading based on the wavelength add/drop module, the wavelength add/drop module converts combined wavelength signals received by the M third ports 60 into a plurality of single-wavelength signals, and outputs the plurality of single-wavelength signals to the N fourth ports 70.

It should be noted that, because the first wavelength add/drop module 20 is an M×N wavelength selective switch, the M×N wavelength selective switch may be a blocking wavelength selective switch, or may be a non-blocking wavelength selective switch.

Because the M×N wavelength selective switch is a blocking wavelength selective switch, the M×N wavelength selective switch cannot simultaneously download signals of a same wavelength or simultaneously upload signals of a same wavelength. Because the M×N wavelength selective switch is a non-blocking wavelength selective switch, the M×N wavelength selective switch can simultaneously download signals of a same wavelength, and can also simultaneously upload signals of a same wavelength.

In this embodiment of this application, directions are relative, and are specifically determined by relative positions of two reconfigurable optical add/drop multiplexers. For example, it is assumed that the reconfigurable optical add/drop multiplexer shown in FIG. 2 is a first reconfigurable optical add/drop multiplexer and that the first reconfigurable optical add/drop multiplexer is connected to a second reconfigurable optical add/drop multiplexer and a third reconfigurable optical add/drop multiplexer respectively. In this case, relative to the first reconfigurable optical add/drop multiplexer, the second reconfigurable optical add/drop multiplexer may correspond to a first direction, and the third reconfigurable optical add/drop multiplexer may correspond to a second direction.

As can be learned based on the foregoing description, that the X first wavelength selective switches 10 correspond to W directions means that the X first wavelength selective switches 10 are connected to reconfigurable optical add/drop multiplexers in the W directions respectively by using the optical fibers 30.

Because W is greater than 1, the W directions may include the first direction and the second direction. In addition, as W increases, the W directions may further include other directions. For example, in the reconfigurable optical add/drop multiplexer shown in FIG. 2, the W directions further include a third direction.

The first direction corresponds to P first wavelength selective switches 10 among the X first wavelength selective switches 10. Correspondingly, it may also be said that the first direction includes P dimensions, where P is an integer greater than 1. Based on this, the P first wavelength selective switches 10 are connected to the reconfigurable optical add/drop multiplexer in the first direction by using the optical fibers 30.

The second direction corresponds to Q first wavelength selective switches 10 among the X first wavelength selective switches 10. Correspondingly, it may also be said that the second direction includes Q dimensions, where Q is a positive integer, and Q may be the same as or different from P, provided that it is ensured that P+Q is less than or equal to X. Based on this, the Q first wavelength selective switches 10 are connected to the reconfigurable optical add/drop multiplexer in the second direction by using the optical fibers 30.

As one of the Y wavelength add/drop modules, the first wavelength add/drop module 20 is connected to A of the P first wavelength selective switches 10 by using the optical fibers 30, and connected to B of the Q first wavelength selective switches 10 by using the optical fibers 30, where A is a positive integer less than P, and B is a positive integer less than or equal to Q.

For example, one first port 40 is disposed on the first side of the first wavelength selective switch 10, K second ports 50 are disposed on the second side of the first wavelength selective switch 10, M third ports 60 are disposed on the first side of the first wavelength add/drop module 20, and N fourth ports 70 are disposed on the second side of the first wavelength add/drop module 20. In this case, A third ports 60 in the first wavelength add/drop module 20 may be connected to second ports 50 of A first wavelength selective switches 10 among the P first wavelength selective switches 10 by using the optical fibers 30, and connected to second ports 50 of B first wavelength selective switches among the Q first wavelength selective switches 10 by using the optical fibers 30.

It may be understood that, when Q is greater than 1, to further reduce a quantity of first wavelength selective switches 10 connected to the first wavelength add/drop module 20, B may be set to be less than Q.

Based on the foregoing description, the first wavelength add/drop module 20 may download signals from or upload signals to A of the P first wavelength selective switches 10, or may download signals from or upload signals to B of the Q first wavelength selective switches 10.

It should be noted that, to ensure that the first wavelength selective switches 10 corresponding to the first direction and the first wavelength selective switches 10 corresponding to the second direction can perform wavelength switching, the P first wavelength selective switches 10 corresponding to the first direction may be connected to the Q first wavelength selective switches 10 corresponding to the second direction. Specifically, second ports 50 of the P first wavelength selective switches 10 may be connected to second ports 50 of the Q first wavelength selective switches 10 by using the optical fibers 30. The connection manner is a relatively mature technology. Therefore, details are not described herein again.

With reference to FIG. 2, the following further describes a connection relationship between the Y wavelength add/drop modules and the X wavelength selective modules.

The reconfigurable optical add/drop multiplexer shown in FIG. 2 is used as an example. The W directions include the first direction, the second direction, and the third direction. Each direction corresponds to four first wavelength selective switches 10, that is, there are four dimensions in each direction. In FIG. 2, the reconfigurable optical add/drop multiplexer further includes four wavelength add/drop modules. The first wavelength add/drop module 20 is used as an example. The first wavelength add/drop module 20 is connected to two first wavelength selective switches 10 numbered 1 and 2 among the four first wavelength selective switches 10 corresponding to the first direction. The first wavelength add/drop module 20 is connected to two first wavelength selective switches 10 numbered 5 and 6 among the four first wavelength selective switches 10 corresponding to the second direction. The first wavelength add/drop module 20 is connected to two first wavelength selective switches 10 numbered 9 and 10 among the four first wavelength selective switches 10 corresponding to the third direction. In addition, the first wavelength selective switch 10 numbered 1 among the four first wavelength selective switches 10 corresponding to the first direction is used as an example. Second ports 50 of the first wavelength selective switch 10 numbered 1 are connected to second ports 50 of the eight first wavelength selective switches 10 corresponding to the second direction and the third direction respectively by using the optical fibers 30, to implement wavelength switching between the first wavelength selective switches 10 in different directions.

In the reconfigurable optical add/drop multiplexer shown in FIG. 1, each wavelength add/drop module is connected to any first wavelength selective switch 10 in any direction.

Therefore, in the reconfigurable optical add/drop multiplexer shown in FIG. 2, each wavelength add/drop module requires only six third ports 60, and each first wavelength selective switch 10 requires only 10 second ports 50, while in the reconfigurable optical add/drop multiplexer shown in FIG. 1, each wavelength add/drop module requires eight third ports 60, and each first wavelength selective switch 10 requires 12 second ports 50.

As can be learned based on the foregoing description, in this embodiment of this application, because A is less than P, the first wavelength add/drop module 20 is connected only to a part of the first wavelength selective switches 10 corresponding to the first direction. Therefore, a quantity of ports of the first wavelength add/drop module 20 can be reduced, and a scale of the first wavelength add/drop module 20 can be reduced. Therefore, performance of the first wavelength add/drop module 20 is improved, and a volume and costs of the first wavelength add/drop module 20 are reduced. Improving performance of the first wavelength add/drop module 20 may include: reducing an insertion loss of the first wavelength add/drop module 20, improving a filtering characteristic of the first wavelength add/drop module 20, and reducing crosstalk of the first wavelength add/drop module 20.

It may be understood that, for other directions among the Y directions, because the first wavelength add/drop module 20 is also connected only to a part of the first wavelength selective switches 10, performance of the first wavelength add/drop module 20 can be further improved, and the volume and costs of the first wavelength add/drop module 20 can be reduced.

In addition, for one first wavelength selective switch 10, a quantity of wavelength add/drop modules connected to the first wavelength selective switch 10 can also be reduced. Therefore, in this embodiment of this application, performance of the first wavelength selective switch 10 can also be improved, and a volume and costs of the first wavelength selective switch 10 can be reduced.

Further, because the quantity of first wavelength selective switches 10 connected to the first wavelength add/drop module 20 is reduced, the quantity of optical fibers 30 in the reconfigurable optical add/drop multiplexer can also be reduced.

It should be noted that the reconfigurable optical add/drop multiplexer in this embodiment of this application is particularly applicable to a scenario in which a direction includes more dimensions. In the scenario in which the direction includes more dimensions, it can be better ensured that a port scale of the wavelength add/drop module is not excessively large.

The quantity P of the first wavelength selective switches 10 corresponding to the first direction and the quantity Q of the first wavelength selective switches 10 corresponding to the second direction are not specifically limited in the foregoing embodiment. When P changes, among the P first wavelength selective switches 10, the quantity A of the first wavelength selective switches 10 connected to the first wavelength add/drop module 20 may change accordingly. When Q changes, among the Q first wavelength selective switches 10, the quantity B of the first wavelength selective switches 10 connected to the first wavelength add/drop module 20 may also change accordingly. The following describes a relationship between the quantities A and B based on relative values of P and Q.

Based on the foregoing embodiment, in another embodiment of the reconfigurable optical add/drop multiplexer provided in this embodiment of this application, P is equal to Q, and A is equal to B.

For example, as shown in FIG. 2, each of the first direction and the second direction corresponds to four first wavelength selective switches 10. The first wavelength add/drop module 20 is connected to two first wavelength selective switches 10 numbered 1 and 2 among the four first wavelength selective switches 10 corresponding to the first direction. The first wavelength add/drop module 20 is further connected to two first wavelength selective switches 10 numbered 5 and 6 among the four first wavelength selective switches 10 corresponding to the second direction, that is, A is equal to B.

Because A is equal to B, in the first wavelength add/drop module 20, a quantity of third ports 60 configured to connect to the first wavelength selective switches 10 corresponding to the first direction is equal to a quantity of third ports 60 configured to connect to the first wavelength selective switches 10 corresponding to the second direction. Therefore, it is ensured that the third ports 60 of the first wavelength add/drop module 20 are evenly allocated in the first direction and the second direction.

In another embodiment of the reconfigurable optical add/drop multiplexer provided in this embodiment of this application, P is greater than Q, and A is greater than or equal to B.

It may be understood that, because P is greater than Q, it indicates that a quantity of wavelength combinations of signals from the first direction is greater than that of signals from the second direction. Therefore, A may be greater than B, so that signals of more wavelength combinations are received from the P first wavelength selective switches 10 corresponding to the first direction. However, because there is no great difference between P and Q, alternatively, A may be set to be equal to B.

For example, based on an assumption that the first direction corresponds to four first wavelength selective switches 10, and that the second direction corresponds to six first wavelength selective switches 10, the first wavelength add/drop module 20 may be connected to two of the four first wavelength selective switches 10 corresponding to the first direction, and also connected to three of the six first wavelength selective switches 10 corresponding to the second direction. Based on an assumption that the first direction corresponds to four first wavelength selective switches 10, and that the second direction corresponds to five first wavelength selective switches 10, the first wavelength add/drop module 20 may be connected to two of the four first wavelength selective switches 10 corresponding to the first direction, and also connected to two of the five first wavelength selective switches 10 corresponding to the second direction.

Because A is equal to or greater than B, in the first wavelength add/drop module 20, the quantity of third ports 60 configured to connect to the first wavelength selective switches 10 corresponding to the first direction is equal to or greater than the quantity of third ports 60 configured to connect to the first wavelength selective switches 10 corresponding to the second direction. Therefore, a quantity of third ports 60 allocated in each direction in the first wavelength add/drop module 20 remains unchanged or increases with the increase of dimensions in the direction.

In the foregoing implementations, the first wavelength add/drop module 20 is connected only to a part of the P first wavelength selective switches 10, and based on this, each of the Y wavelength add/drop modules is connected only to a part of the P first wavelength selective switches 10. In this case, in the first direction, a first wavelength selective switch 10 is possibly not connected to any one of the wavelength add/drop modules, and this means that the Y wavelength add/drop modules cannot receive a signal from any one of the P first wavelength selective switches 10.

Figure 3:
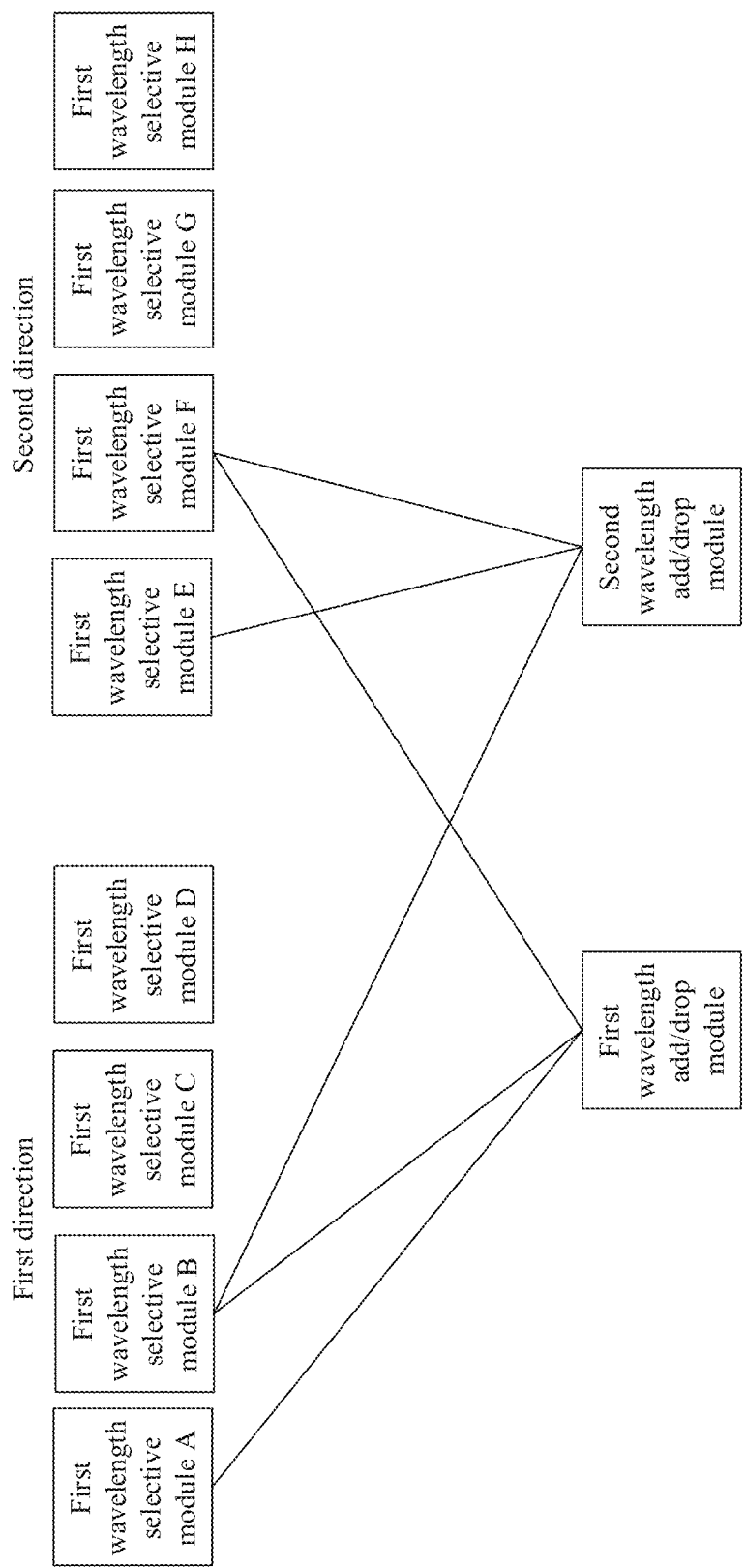
FIG. 3 is a schematic diagram of a second embodiment of a reconfigurable optical add/drop multiplexer according to an embodiment of this application.

For example, FIG. 3 is a schematic diagram of a second embodiment of the reconfigurable optical add/drop multiplexer according to an embodiment of this application. The reconfigurable optical add/drop multiplexer shown in FIG. 3 includes a first wavelength add/drop module and a second wavelength add/drop module, and each of the first direction and the second direction corresponds to four first wavelength selective switches.

The first direction is used as an example. The first direction corresponds to a first wavelength selective switch A, a first wavelength selective switch B, a first wavelength selective switch C, and a first wavelength selective switch D. The first wavelength add/drop module is connected to the first wavelength selective switch A and the first wavelength selective switch B respectively among the four first wavelength selective switches corresponding to the first direction. The second wavelength add/drop module is connected only to the first wavelength selective switch B among the four first wavelength selective switches corresponding to the first direction. In this case, the first wavelength selective switch C and the first wavelength selective switch D among the four first wavelength selective switches corresponding to the first direction are neither connected to the first wavelength add/drop module nor connected to the second wavelength add/drop module. Therefore, neither the first wavelength add/drop module nor the second wavelength add/drop module can receive signals from the first wavelength selective switch C and the first wavelength selective switch D.

Similarly, as shown in FIG. 3, for the second direction, neither the first wavelength add/drop module nor the second wavelength add/drop module can receive signals from a corresponding first wavelength selective switch G and a corresponding first wavelength selective switch H.

Therefore, based on the foregoing embodiment, in another embodiment of the reconfigurable optical add/drop multiplexer provided in this embodiment of this application, Y is greater than 1, and any one of the P first wavelength selective switches is connected to at least one of the Y wavelength add/drop modules by using an optical fiber.

It may be understood that, because each of the P first wavelength selective switches is connected to a wavelength add/drop module, it is ensured that the Y wavelength add/drop modules can receive signals from any one of the P first wavelength selective switches corresponding to the first direction.

Similarly, based on the foregoing embodiment, in another embodiment of the reconfigurable optical add/drop multiplexer provided in this embodiment of this application, Q is greater than 1, Y is greater than 1, and any one of the Q first wavelength selective switches is connected to at least one of the Y wavelength add/drop modules by using an optical fiber.

It may be understood that, because each of the Q first wavelength selective switches is connected to a wavelength add/drop module, it is ensured that the Y wavelength add/drop modules can receive signals from any one of the Q first wavelength selective switches corresponding to the second direction.

Figure 4:
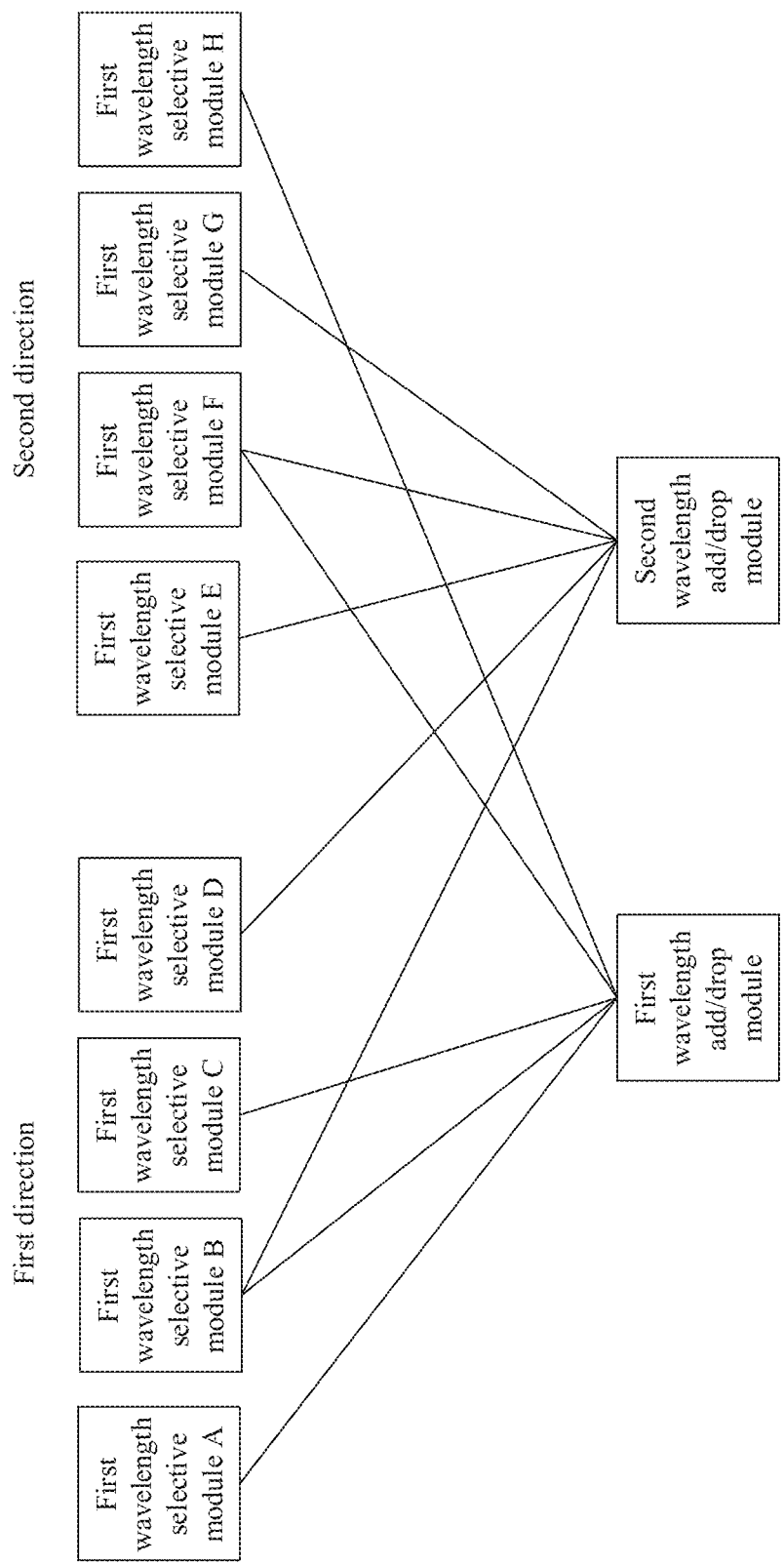
FIG. 4 is a schematic diagram of a third embodiment of a reconfigurable optical add/drop multiplexer according to an embodiment of this application.

The following describes the embodiment in detail with reference to FIG. 4. FIG. 4 is a schematic diagram of a third embodiment of the reconfigurable optical add/drop multiplexer according to an embodiment of this application. The reconfigurable optical add/drop multiplexer shown in FIG. 4 includes a first wavelength add/drop module and a second wavelength add/drop module, and each of the first direction and the second direction corresponds to four first wavelength selective switches. A first wavelength selective switch A, a first wavelength selective switch B, and a first wavelength selective switch C corresponding to the first direction are respectively connected to the first wavelength add/drop module, and the first wavelength selective switch B and the first wavelength selective switch D corresponding to the first direction are respectively connected to the second wavelength add/drop module. Therefore, it is ensured that in the reconfigurable optical add/drop multiplexer, the first wavelength add/drop module and the second wavelength add/drop module can receive signals from any first wavelength selective switch in the first direction.

Similarly, a first wavelength selective switch E, a first wavelength selective switch F, and a first wavelength selective switch G corresponding to the second direction are respectively connected to the second wavelength add/drop module, and the first wavelength selective switch F and the first wavelength selective switch H corresponding to the second direction are respectively connected to the first wavelength add/drop module. Therefore, it is ensured that in the reconfigurable optical add/drop multiplexer, the first wavelength add/drop module and the second wavelength add/drop module can also receive signals from any first wavelength selective switch in the second direction.

In the foregoing embodiment, the reconfigurable optical add/drop multiplexer shown in FIG. 4 is used as an example. The first wavelength add/drop module is connected to three of the four first wavelength selective switches corresponding to the first direction. The second wavelength add/drop module is connected to two of the four first wavelength selective switches corresponding to the first direction. In other words, three third ports in the first wavelength add/drop module are allocated to the first direction, and two third ports in the second wavelength add/drop module are allocated to the first direction. Therefore, it can be learned that the third ports of the first wavelength add/drop module and the third ports of the second wavelength add/drop module are unevenly allocated in the first direction.

To ensure even allocation of the third ports, based on the foregoing embodiment, in another embodiment of the reconfigurable optical add/drop multiplexer provided in this embodiment of this application, the Y wavelength add/drop modules further include the second wavelength add/drop module; and among the P first wavelength selective switches, a quantity of first wavelength selective switches connected to the first wavelength add/drop module is equal to a quantity of first wavelength selective switches connected to the second wavelength add/drop module.

Figure 5:
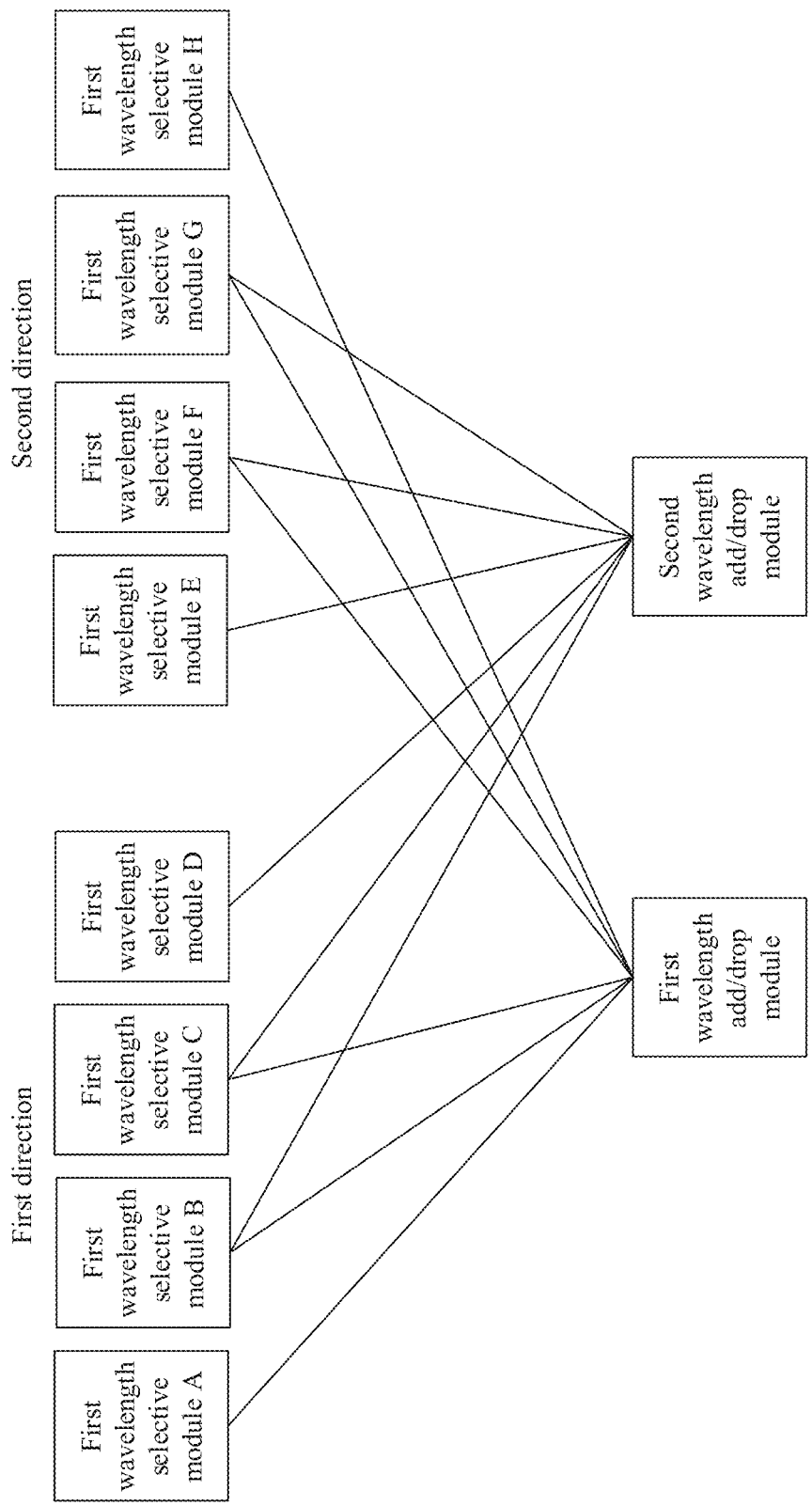
FIG. 5 is a schematic diagram of a fourth embodiment of a reconfigurable optical add/drop multiplexer according to an embodiment of this application.

Because among the P first wavelength selective switches, the quantity of first wavelength selective switches connected to the first wavelength add/drop module is equal to the quantity of first wavelength selective switches connected to the second wavelength add/drop module, the reconfigurable optical add/drop multiplexer may be shown in FIG. 5. The first wavelength add/drop module is connected to three of the four first wavelength selective switches corresponding to the first direction, and the second wavelength add/drop module is also connected to three of the four first wavelength selective switches corresponding to the first direction. Therefore, it is ensured that the third ports of the first wavelength add/drop module and the third ports of the second wavelength add/drop module are evenly allocated in the first direction.

The reconfigurable optical add/drop multiplexer shown in FIG. 4 is still used as an example. For the first direction, the first wavelength selective switch A, the first wavelength selective switch C, and the first wavelength selective switch D are all connected only to one wavelength add/drop module (the first wavelength add/drop module or the second wavelength add/drop module). However, the first wavelength selective switch B is connected to both the first wavelength add/drop module and the second wavelength add/drop module. Therefore, it can be learned that the third ports are also unevenly allocated on the first wavelength selective switches corresponding to the first direction.

To ensure even allocation of the third ports, based on the foregoing embodiment, in another embodiment of the reconfigurable optical add/drop multiplexer provided in this embodiment of this application, a quantity of wavelength add/drop modules connected to each of the P first wavelength selective switches is the same.

Figure 6:
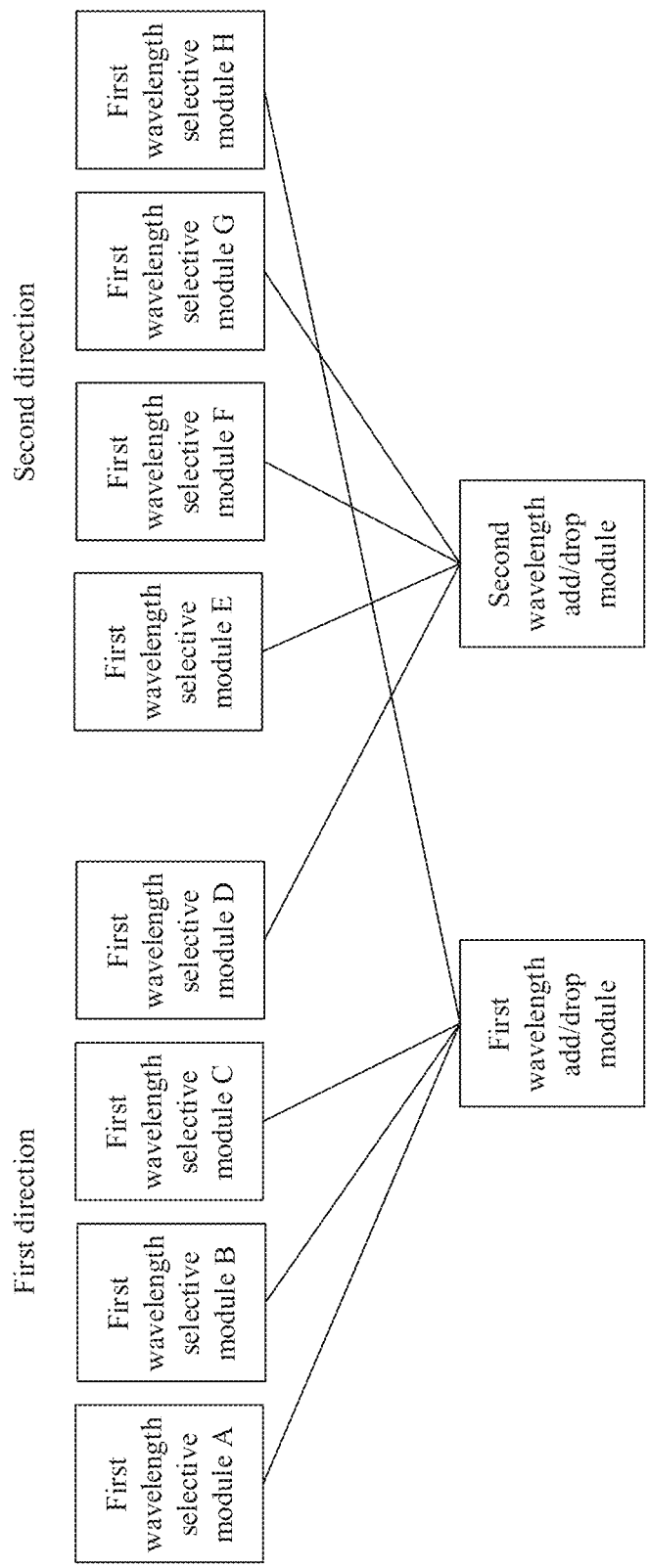
FIG. 6 is a schematic diagram of a fifth embodiment of a reconfigurable optical add/drop multiplexer according to an embodiment of this application.

Because the quantity of wavelength add/drop modules connected to each of the P first wavelength selective switches is the same, the reconfigurable optical add/drop multiplexer may be shown in FIG. 6. Any one of the four first wavelength selective switches corresponding to the first direction is connected to one wavelength add/drop module (the first wavelength add/drop module or the second wavelength add/drop module). Therefore, it is ensured that the third ports are evenly allocated on the first wavelength selective switches corresponding to the first direction.

Figure 7:
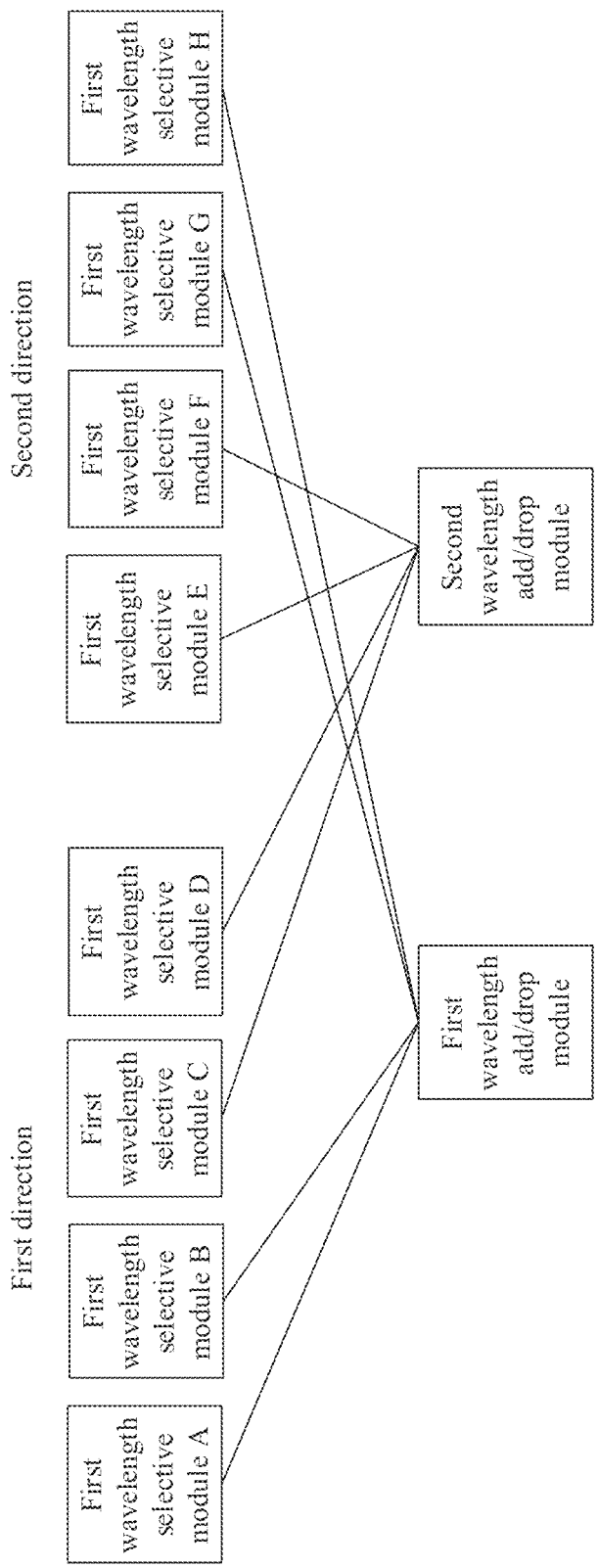
FIG. 7 is a schematic diagram of a sixth embodiment of a reconfigurable optical add/drop multiplexer according to an embodiment of this application.

Because among the P first wavelength selective switches, the quantity of first wavelength selective switches connected to the first wavelength add/drop module is equal to the quantity of first wavelength selective switches connected to the second wavelength add/drop module, and the quantity of wavelength add/drop modules connected to each of the P first wavelength selective switches is the same, an architecture of the reconfigurable optical add/drop multiplexer may be shown in FIG. 7. The first wavelength selective switch A and the first wavelength selective switch B corresponding to the first direction are respectively connected to the first wavelength add/drop module. The first wavelength selective switch C and the first wavelength selective switch D corresponding to the first direction are respectively connected to the second wavelength add/drop module. Therefore, the reconfigurable optical add/drop multiplexer can ensure even allocation of the third ports from various aspects.

Similarly, based on the foregoing embodiment, in another embodiment of the reconfigurable optical add/drop multiplexer provided in this embodiment of this application, the Y wavelength add/drop modules further include a third wavelength add/drop module; and among the Q first wavelength selective switches, a quantity of first wavelength selective switches connected to the first wavelength add/drop module is equal to a quantity of first wavelength selective switches connected to the third wavelength add/drop module.

Based on the foregoing embodiment, in another embodiment of the reconfigurable optical add/drop multiplexer provided in this embodiment of this application, a quantity of wavelength add/drop modules connected to each of the Q first wavelength selective switches is the same.

It should be noted that a connection relationship between the Q first wavelength selective switches corresponding to the second direction and the first wavelength add/drop module and the second wavelength add/drop module may be understood with reference to the related description of the connection relationship between the P first wavelength selective switches and the first wavelength add/drop module and the second wavelength add/drop module in the foregoing embodiment. Details are not described herein again.

As can be learned based on the foregoing description, the first port may be connected to the another reconfigurable optical add/drop multiplexer at the peer end in a plurality of manners by using an optical fiber. The following describes two connection manners.

Based on the foregoing embodiment, in another embodiment of the reconfigurable optical add/drop multiplexer provided in this embodiment of this application, each first port of the P first wavelength selective switches is connected to one single-core single-mode optical fiber, that is, the P first wavelength selective switches are respectively connected to the another reconfigurable optical add/drop multiplexer at the peer end by using P single-core single-mode optical fibers. Therefore, the P first wavelength selective switches perform wavelength division multiplexing signal transmission with the another reconfigurable optical add/drop multiplexer at the peer end by using the P single-core single-mode optical fibers.

For example, each first port of the Q first wavelength selective switches may also be connected to one single-core single-mode optical fiber, that is, the Q first wavelength selective switches are respectively connected to the another reconfigurable optical add/drop multiplexer at the peer end by using Q single-core single-mode optical fibers.

Figure 8:
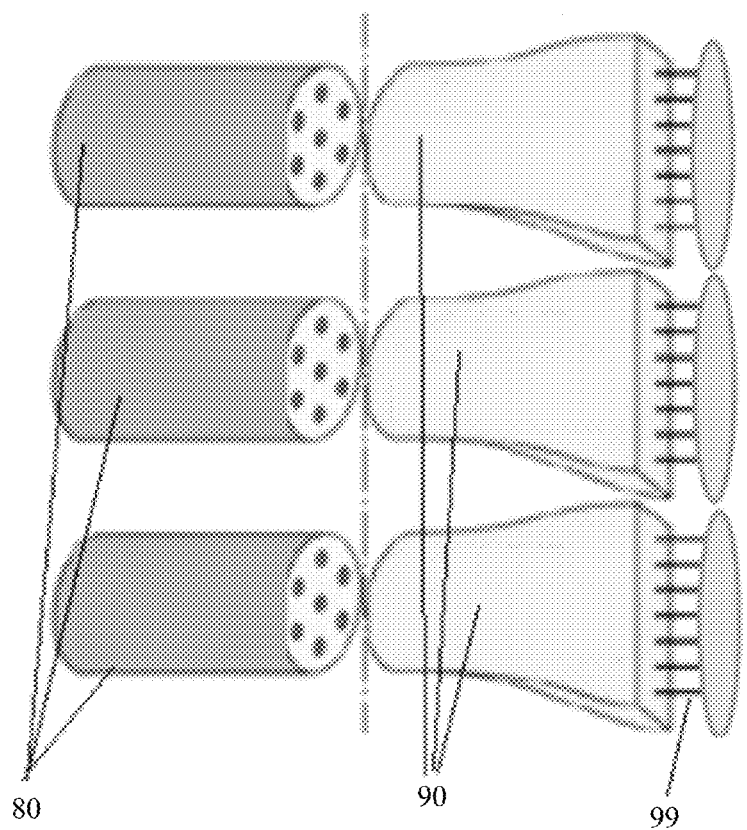
FIG. 8 is a schematic diagram of a connection relationship between a demultiplexer and a space division multiplexing optical fiber according to an embodiment of this application.

Based on the foregoing embodiment, FIG. 8 is a schematic diagram of a connection relationship between a demultiplexer and a space division multiplexing optical fiber according to an embodiment of this application. In another embodiment of the reconfigurable optical add/drop multiplexer provided in this embodiment of this application, the P first wavelength selective switches are connected to a demultiplexer 90, P output ports 99 are disposed on a first side of the demultiplexer 90, and one input port is disposed on a second side of the demultiplexer.

Based on this, the first ports of the P first wavelength selective switches are respectively connected to the P output ports 99 on the first side of the demultiplexer.

As shown in FIG. 8, the input port on the second side of the demultiplexer 90 is connected to a space division multiplexing optical fiber 80, where the space division multiplexing optical fiber 80 may include a multi-core optical fiber or a multi-mode optical fiber.

It may be understood that first wavelength selective switches corresponding to other directions among the W directions may also be connected to the demultiplexer 90. A specific connection manner may be understood with reference to the foregoing related description of the connection manner between the P first wavelength selective switches and the demultiplexer 90.

Specifically, FIG. 8 shows three space division multiplexing optical fibers 80 and three demultiplexers 90, where the space division multiplexing optical fibers 80 are connected to the demultiplexers 90 in a one-to-one correspondence. It can be learned from a cross section of a space division multiplexing optical fiber 80 in FIG. 8 that the space division multiplexing optical fiber 80 is a seven-core optical fiber. Correspondingly, a demultiplexer 90 includes seven output ports 99, and each output port 99 may be connected to a first port of a first wavelength selective switch.

This embodiment of this application may be applied to a space division multiplexing scenario. In this scenario, the P first wavelength selective switches transmit signals by using the space division multiplexing optical fibers 80. Specifically, a demultiplexer 90 outputs a plurality of signals in a space division multiplexing optical fiber 80 to first ports of the first wavelength selective switches respectively.

The connection relationship between the Y wavelength add/drop modules and the X first wavelength selective switches is described above, and there are a plurality of methods for determining the connection relationship. The following describes a method for determining the connection relationship between the Y wavelength add/drop modules and the X first wavelength selective switches.

To ensure even allocation of the third ports in the wavelength add/drop modules, the Y wavelength add/drop modules may be first numbered, each wavelength add/drop module corresponds to one index, and then each wavelength add/drop module is sequentially connected to the X first wavelength selective switches based on an index order.

Connecting the wavelength add/drop module to the X first wavelength selective switches includes: first numbering third ports on each wavelength add/drop module, where each third port corresponds to one index; and then connecting each third port on the wavelength add/drop module to the X first wavelength selective switches based on an index order.

Connecting the third port on the wavelength add/drop module to the X first wavelength selective switches includes: first numbering the X first wavelength selective switches, where each first wavelength selective switch corresponds to one index; determining the W directions corresponding to the X first wavelength selective switches and an index corresponding to each direction; then determining, based on a first formula, an index of a direction corresponding to the current third port; and finally, determining an index of a first wavelength selective switch based on a second formula.

A prerequisite for applying the first formula and the second formula is that quantities of first wavelength selective switches corresponding to the W directions are equal, and that scales of the Y wavelength add/drop modules are the same.

Specifically, the first formula is $d_r^m =$ $$\begin{cases} W, & \mod(m_r, W) = 0 \\ \mod(m_r, W), & \mod(m_r, W) \neq 0 \end{cases}; \text{ and the second formula is}$$

$\beta_r^m =$ $$\begin{cases} f, & \mod((M \times (r-p) + m_r)/W, f) = 0 \\ \mod(\lfloor (M \times (r-p) + m_r)/W \rfloor, f), & \mod(\lfloor (M \times (r-p) + m_r)/W \rfloor, f) \neq 0 \end{cases},$$

where W represents a total quantity of directions, f represents a quantity of first wavelength selective switches corresponding to each direction, r represents an index of a wavelength add/drop module, $m_r$ represents an index of a third port on an $r^{th}$ wavelength add/drop module, $d_r^m$ represents an index of a direction corresponding to an $m_r^{th}$ third port, $\beta_r^m$ represents an index of a first wavelength selective switch corresponding to the $m_r^{th}$ third port, M is a total quantity of third ports on a wavelength add/drop module, p represents a quantity of wavelength add/drop modules on which all third ports have been connected, mod represents a modulo function, and $|(M\times(r-p)+m_r)/w|$ means rounding up $(M\times(r-p)+m_r)/W$.

Figure 9:
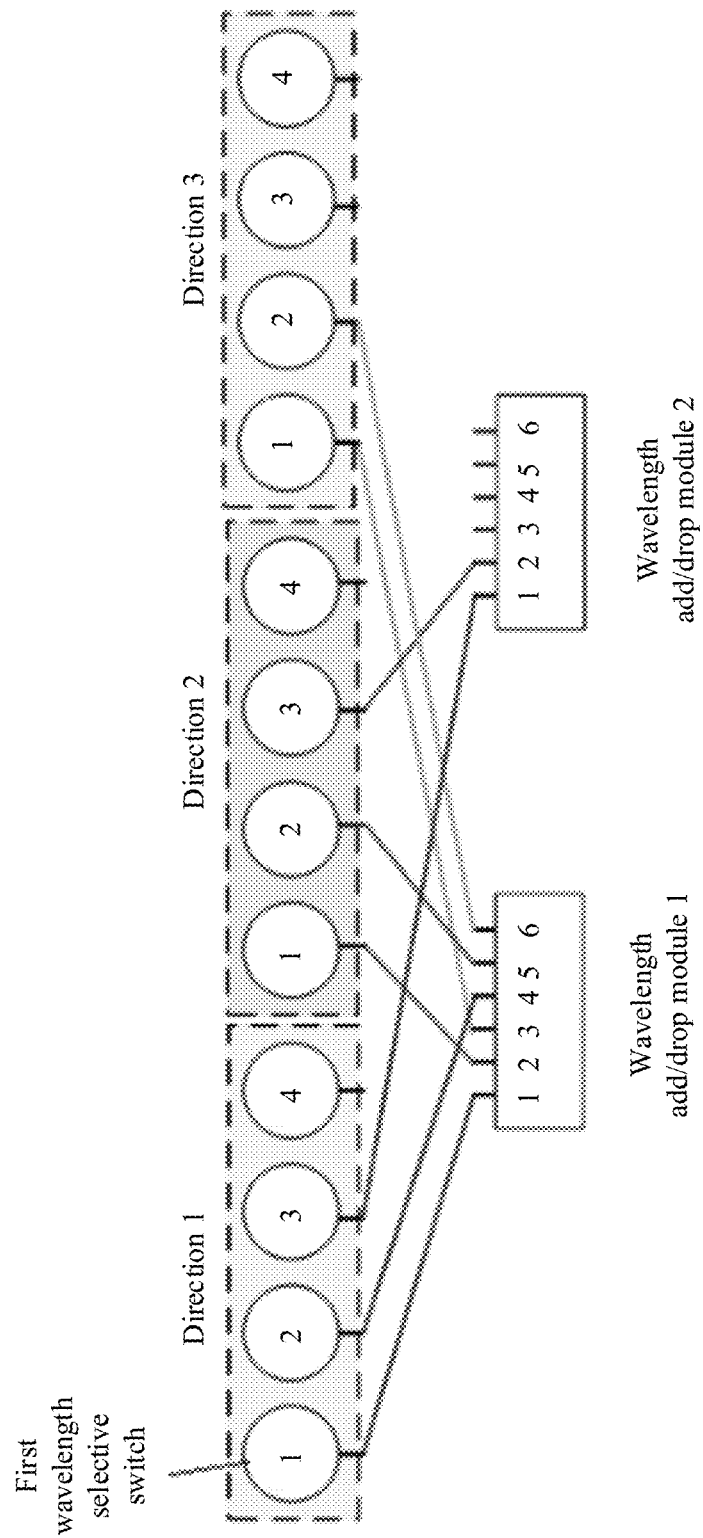
FIG. 9 is a schematic diagram of an embodiment for determining a direction corresponding to a third port.
Figure 10:
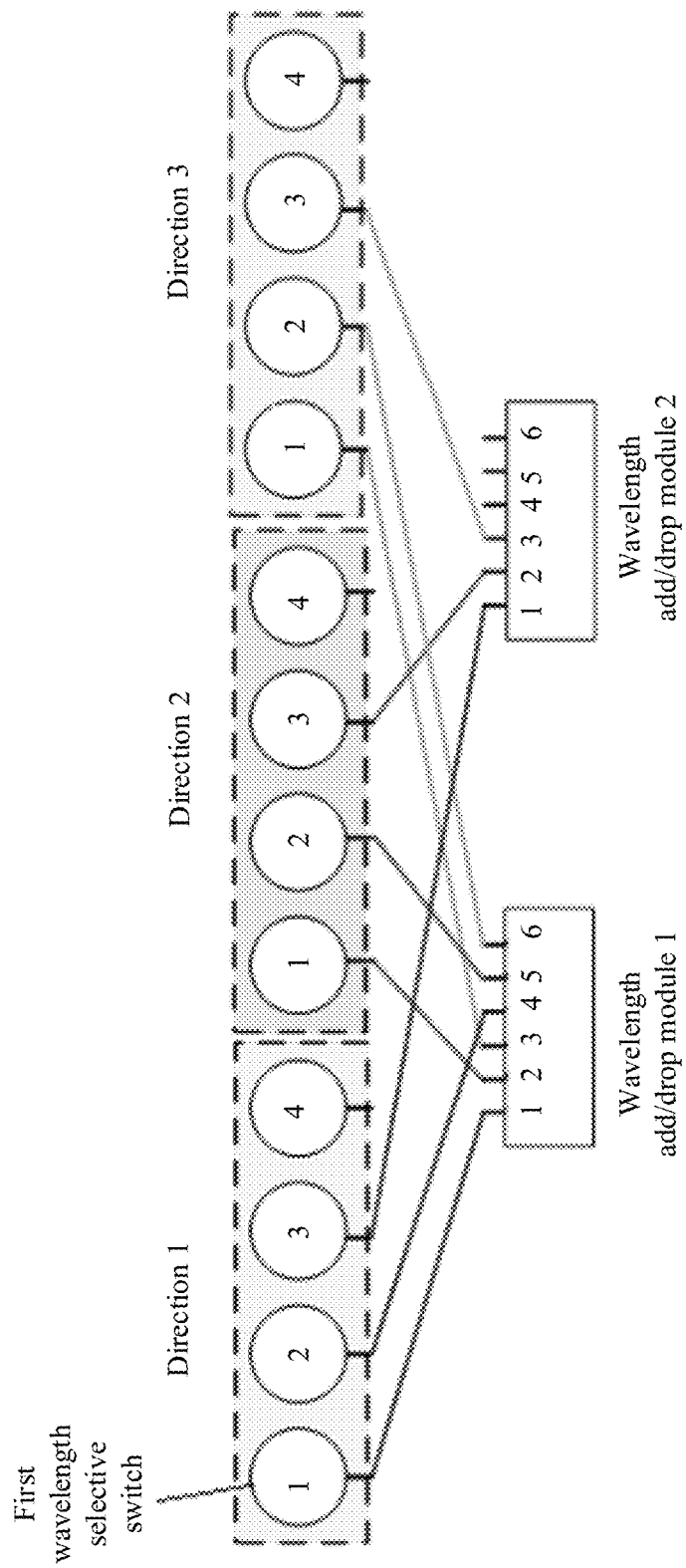
FIG. 10 is a schematic diagram of an embodiment for determining a first wavelength selective switch corresponding to a third port.

The following describes the foregoing method in detail with reference to FIG. 9 and FIG. 10. FIG. 9 is a schematic diagram of an embodiment for determining a direction corresponding to a third port. FIG. 10 is a schematic diagram of an embodiment for determining a first wavelength selective switch corresponding to a third port.

A reconfigurable optical add/drop multiplexer shown in FIG. 9 and FIG. 10 includes a wavelength add/drop module 1, a wavelength add/drop module 2, and 12 first wavelength selective switches.

The 12 first wavelength selective switches correspond to a direction 1, a direction 2, and a direction 3, indexes of four first wavelength selective switches corresponding to the direction 1 are sequentially 1 to 4, indexes of four first wavelength selective switches corresponding to the direction 2 are sequentially 1 to 4, and indexes of four first wavelength selective switches corresponding to the direction 3 are sequentially 1 to 4.

Six third ports are disposed on the wavelength add/drop module 1, and indexes of the six third ports are respectively 1 to 6. Six third ports are also disposed on the wavelength add/drop module 2, and indexes of the six third ports are respectively 1 to 6.

One Example

As shown in FIG. 9 and FIG. 10, assuming that a third port indicated by the index 3 in the wavelength add/drop module 2 needs to be connected to one of the 12 first wavelength selective switches in this case, first, a direction corresponding to the third port indicated by the index 3 in the wavelength add/drop module 2 may be determined by using the first formula, that is, r is 2, $m_r$ is 3, and W is 3. In this case, $mod(m_r, W)=mod(3,3)=0$. Therefore $d_r^m=W=3$. $d_r^m=3$ indicates that the direction corresponding to the third port indicated by the index 3 in the wavelength add/drop module 2 is the direction 3.

Then by using the second formula, a first wavelength selective switch corresponding to the third port indicated by the index 3 in the wavelength add/drop module 2 is determined. Specifically, f is 4, and M is 6. Because all third ports on the wavelength add/drop module 1 have been connected, P is 1. In this case, $mod(|(M\times(r-p)+m_r)W|,f)=mod(|6\times(2-1)+3)/3|,4)=3$. In this case, $\beta_r^m=3$, indicating that an index of the first wavelength selective switch corresponding to the third port indicated by the index 3 in the wavelength add/drop module 2 is 3.

Finally, it may be determined that the third port indicated by the index 3 in the wavelength add/drop module 2 corresponds to the first wavelength selective switch indicated by the index 3 in the direction 3. As shown in FIG. 10, the third port indicated by the index 3 in the wavelength add/drop module 2 is connected to the first wavelength selective switch indicated by the index 3 in the direction 3.

Another Example

As shown in FIG. 10, after the third port indicated by the index 3 in the wavelength add/drop module 2 is connected to the first wavelength selective switch indicated by the index 3 in the direction 3, a third port indicated by the index 4 in the wavelength add/drop module 2 needs to be connected to one of the 12 first wavelength selective switches. First, a direction corresponding to the third port indicated by the index 4 in the wavelength add/drop module 2 may be determined by using the first formula, that is, r is 2, $m_r$ is 4, and W is 3. In this case, $mod(m_r, =mod(4, 3)=1$. Therefore, $d_r^m=1$. $d_r^m=1$ indicates that the direction corresponding to the third port indicated by the index 4 in the wavelength add/drop module 2 is the direction 1.

Then by using the second formula, a first wavelength selective switch corresponding to the third port indicated by the index 4 in the wavelength add/drop module 2 is determined. Specifically, f is 4, and M is 6. Because all third ports on the wavelength add/drop module 1 have been connected, P is 1. In this case, $mod((|M\times(r-p)+m_r)/|,f=mod(|6\times(2-1)+4)/3|,4)=0$. In this case $\beta_r^m=f=4$, indicating that an index of the first wavelength selective switch corresponding to the third port indicated by the index 4 in the wavelength add/drop module 2 is 4.

Finally, it may be determined that the third port indicated by the index 4 in the wavelength add/drop module 2 corresponds to the first wavelength selective switch indicated by the index 4 in the direction 1. The following describes a communications system in an embodiment of this application with reference to FIG. 11 and FIG. 12.

Figure 11:
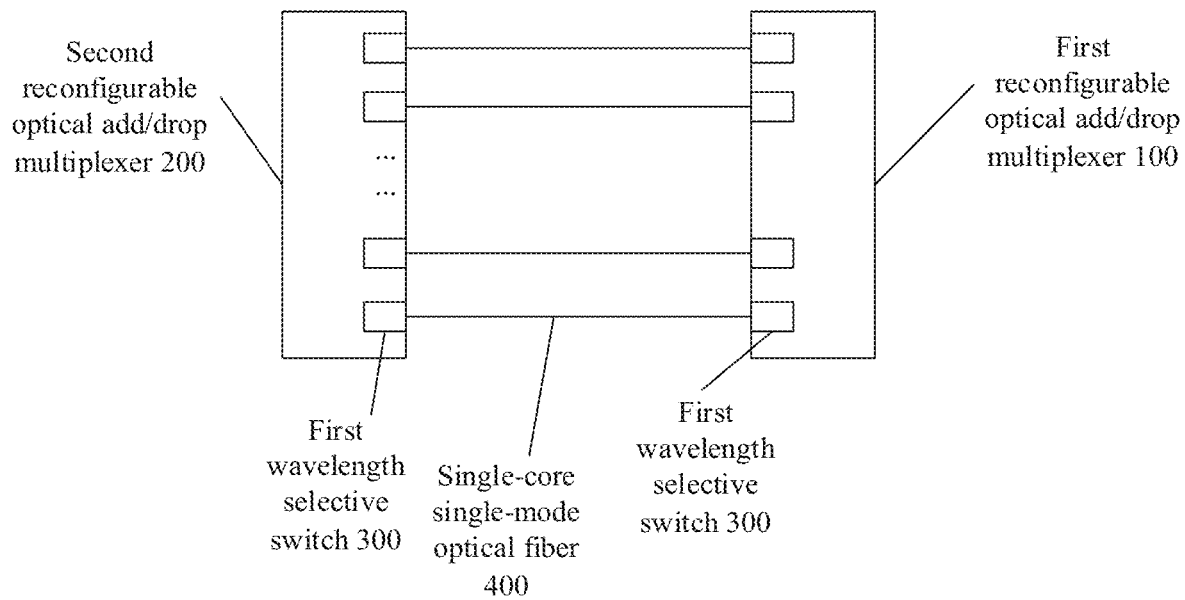
FIG. 11 is a schematic diagram of a first embodiment of a communications system according to an embodiment of this application.

As shown in FIG. 11, an embodiment of this application provides a communications system. The system includes a first reconfigurable optical add/drop multiplexer 100 and a second reconfigurable optical add/drop multiplexer 200.

The first reconfigurable optical add/drop multiplexer 100 may be the reconfigurable optical add/drop multiplexer described in FIG. 2 in the embodiment of this application.

The second reconfigurable optical add/drop multiplexer 200 also includes P first wavelength selective switches 300.

First ports of the P first wavelength selective switches 300 in the second reconfigurable optical add/drop multiplexer 200 are connected to first ports of P first wavelength selective switches 300 in the first reconfigurable optical add/drop multiplexer 100 in a one-to-one correspondence by using single-core single-mode optical fibers 400.

In this communications system, the first reconfigurable optical add/drop multiplexer 100 and the second reconfigurable optical add/drop multiplexer 200 transmit data by using the single-core single-mode optical fibers 400.

Figure 12:
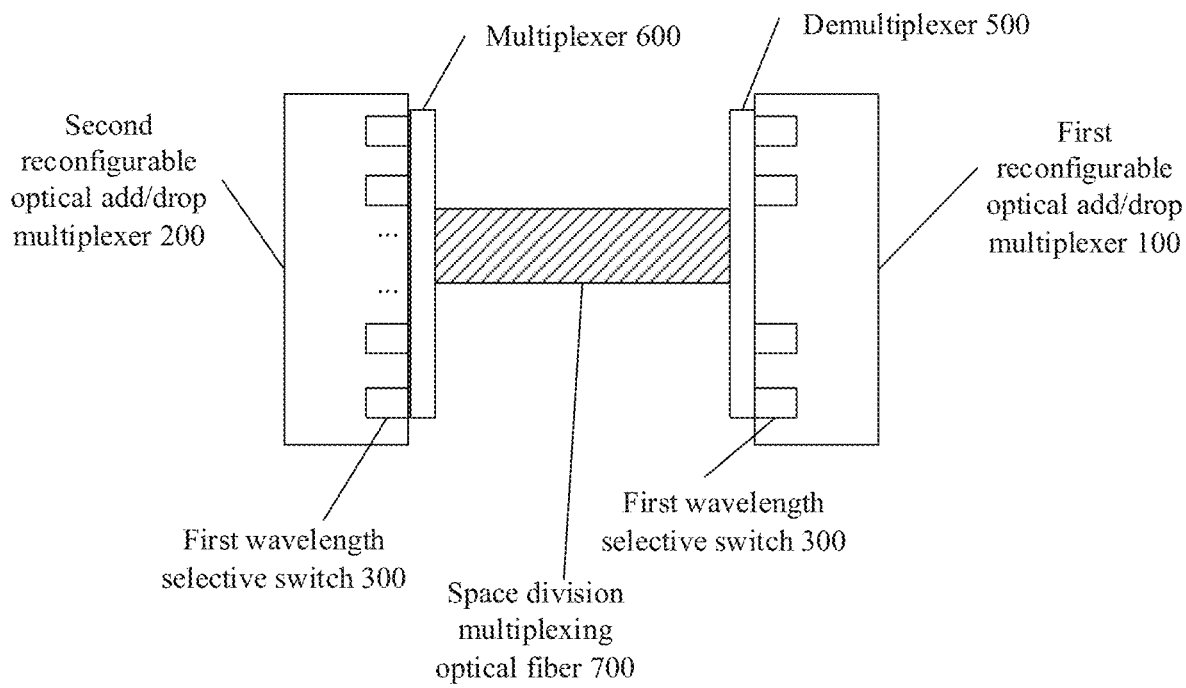
FIG. 12 is a schematic diagram of a second embodiment of a communications system according to an embodiment of this application.

As shown in FIG. 12, an embodiment of this application provides a communications system. The system includes a multiplexer 600, a demultiplexer 500, a first reconfigurable optical add/drop multiplexer 100, and a second reconfigurable optical add/drop multiplexer 200.

The first reconfigurable optical add/drop multiplexer 100 may be the reconfigurable optical add/drop multiplexer described in FIG. 2 in the embodiment of this application.

The second reconfigurable optical add/drop multiplexer 200 also includes P first wavelength selective switches 300.

First ports of P first wavelength selective switches 300 in the first reconfigurable optical add/drop multiplexer 100 are connected to P output ports on a first side of the demultiplexer 500.

First ports of the P first wavelength selective switches 300 in the second reconfigurable optical add/drop multiplexer 200 are connected to P input ports on a first side of the multiplexer 600.

An output port on a second side of the multiplexer 600 is connected to an input port on a second side of the demultiplexer 500 by using a space division multiplexing optical fiber 700.

In this communications system, the first reconfigurable optical add/drop multiplexer 100 and the second reconfigurable optical add/drop multiplexer 200 transmit data by using the space division multiplexing optical fiber 700.

Figure 13:
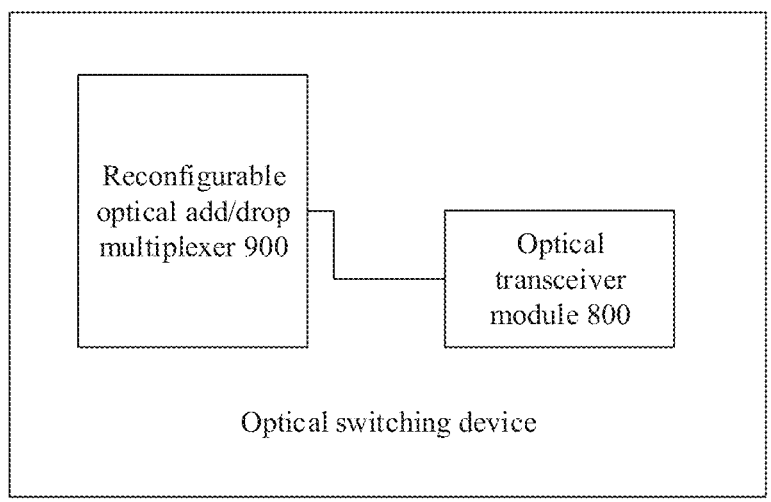
FIG. 13 is a schematic diagram of a structure of an optical switching device according to an embodiment of this application.

FIG. 13 is a schematic diagram of a structure of an optical switching device according to an embodiment of this application. As shown in FIG. 13, this embodiment of this application further provides an optical switching device. The optical switching device includes an optical transceiver module 800 and the reconfigurable optical add/drop multiplexer 900 mentioned in the foregoing embodiment.

The optical transceiver module 800 is connected to a wavelength add/drop module in the reconfigurable optical add/drop multiplexer 900, and configured to perform conversion between an optical signal and an electrical signal.

As can be learned based on the foregoing embodiment, in the reconfigurable optical add/drop multiplexer 900, the wavelength add/drop module is configured to upload or download optical signals; during optical signal downloading based on the wavelength add/drop module, the optical transceiver module 800 converts an optical signal into an electrical signal, and then the optical switching device processes the electrical signal; and during optical signal uploading based on the wavelength add/drop module, the optical transceiver module 800 converts an electrical signal into an optical signal, and the wavelength add/drop module transmits the optical signal to a wavelength selective switch on a line side. In the specification, claims, and accompanying drawings of the embodiments of this application, the terms "first", "second", "third", "fourth", and so on (if existent) do not necessarily indicate a specific order or sequence. It should be understood that data termed in such a way is interchangeable in proper circumstances, so that the embodiments described herein can be implemented in other orders than the order illustrated or described herein. In addition, the terms "include", "have", and any other variant thereof are intended to cover a non-exclusive solution.

What is claimed is:

1. A reconfigurable optical add/drop multiplexer, comprising optical fibers, X first wavelength selective switches, and Y wavelength add/drop modules, wherein:
   the X first wavelength selective switches correspond to W directions, both X and W are integers greater than 1, and Y is a positive integer;
   the W directions comprise a first direction and a second direction;
   the first direction corresponds to P first wavelength selective switches among the X first wavelength selective switches, wherein P is an integer greater than 1;
   the second direction corresponds to Q first wavelength selective switches among the X first wavelength selective switches, wherein Q is a positive integer, and P+Q is less than or equal to X; and
   a first wavelength add/drop module is connected to A of the P first wavelength selective switches by using a first one or more of the optical fibers, and is connected to all of the Q first wavelength selective switches by using a second one or more of the optical fibers, wherein the first wavelength add/drop module is one of the Y wavelength add/drop modules, and A is a positive integer less than P, and wherein each of the Y wavelength add/drop modules comprises a respective wavelength selective switch.

2. The reconfigurable optical add/drop multiplexer according to claim 1, wherein P is greater than Q, and A is greater than or equal to Q.

3. The reconfigurable optical add/drop multiplexer according to claim 1, wherein Y is greater than 1, and any one of the P first wavelength selective switches is connected to at least one of the Y wavelength add/drop modules by using optical fiber.

4. The reconfigurable optical add/drop multiplexer according to claim 3, wherein:
   the Y wavelength add/drop modules further comprise a second wavelength add/drop module; and
   among the P first wavelength selective switches, a quantity of first wavelength selective switches connected to the first wavelength add/drop module is equal to a quantity of first wavelength selective switches connected to the second wavelength add/drop module.

5. The reconfigurable optical add/drop multiplexer according to claim 3, wherein a quantity of wavelength add/drop modules connected to each of the P first wavelength selective switches is the same.

6. The reconfigurable optical add/drop multiplexer according to claim 1, wherein Q is greater than 1, Y is greater than 1, and any one of the Q first wavelength selective switches is connected to at least one of the Y wavelength add/drop modules by using optical fiber.

7. The reconfigurable optical add/drop multiplexer according to claim 5, wherein:
   the Y wavelength add/drop modules further comprise a third wavelength add/drop module; and
   among the Q first wavelength selective switches, a quantity of first wavelength selective switches connected to the first wavelength add/drop module is equal to a quantity of first wavelength selective switches connected to the third wavelength add/drop module.

8. The reconfigurable optical add/drop multiplexer according to claim 6, wherein a quantity of wavelength add/drop modules connected to each of the Q first wavelength selective switches is the same.

9. The reconfigurable optical add/drop multiplexer according to claim 1, wherein:
   one first port is disposed on a first side of each of the first wavelength selective switches, and K second ports are disposed on a second side of each of the first wavelength selective switches, wherein K is an integer greater than 1;
   M third ports are disposed on a first side of the first wavelength add/drop module, and N fourth ports are disposed on a second side of the first wavelength add/drop module, wherein both M and N are positive integers greater than 1;
   A third ports in the first wavelength add/drop module are connected to second ports of the A first wavelength selective switches among the P first wavelength selective switches by using the first one or more of the optical fibers, and connected to second ports of the Q first wavelength selective switches by using the second one or more of the optical fibers; and
   the first port is configured to input or output signals, and the N fourth ports are configured to add or drop signals.

10. The reconfigurable optical add/drop multiplexer according to claim 9, wherein each of first ports of the P first wavelength selective switches is connected to one single-core single-mode optical fiber.

11. The reconfigurable optical add/drop multiplexer according to claim 9, wherein:
    first ports of the P first wavelength selective switches are respectively connected to P output ports on a first side of a demultiplexer; and
    an input port on a second side of the demultiplexer is connected to a space division multiplexing optical fiber.

12. An optical switching device, comprising an optical transceiver module and a reconfigurable optical add/drop multiplexer, wherein:

the reconfigurable optical add/drop multiplexer comprises optical fibers, X first wavelength selective switches, and Y wavelength add/drop modules, wherein the X first wavelength selective switches correspond to W directions, both X and W are integers greater than 1, and Y is a positive integer;

the W directions comprise a first direction and a second direction;

the first direction corresponds to P first wavelength selective switches among the X first wavelength selective switches, wherein P is an integer greater than 1;

the second direction corresponds to Q first wavelength selective switches among the X first wavelength selective switches, wherein Q is a positive integer, and P+Q is less than or equal to X;

a first wavelength add/drop module is connected to A of the P first wavelength selective switches by using a first one or more of the optical fibers, and is connected to all of the Q first wavelength selective switches by using a second one or more of the optical fibers, wherein the first wavelength add/drop module is one of the Y wavelength add/drop modules, and A is a positive integer less than P, and wherein each of the Y wavelength add/drop modules comprises a respective wavelength selective switch; and the optical transceiver module is connected to the first wavelength add/drop module, and configured to perform conversion between an optical signal and an electrical signal.

13. The optical switching device according to claim 12, wherein P is greater than Q, and A is greater than or equal to Q.

14. The optical switching device according to claim 12, wherein Y is greater than 1, and any one of the P first wavelength selective switches is connected to at least one of the Y wavelength add/drop modules by using optical fiber.

15. The optical switching device according to claim 14, wherein:

the Y wavelength add/drop modules further comprise a second wavelength add/drop module; and among the P first wavelength selective switches, a quantity of first wavelength selective switches connected to the first wavelength add/drop module is equal to a quantity of first wavelength selective switches connected to the second wavelength add/drop module.

16. The optical switching device according to claim 14, wherein a quantity of wavelength add/drop modules connected to each of the P first wavelength selective switches is the same.

17. The optical switching device according to claim 12, wherein Q is greater than 1, Y is greater than 1, and any one of the Q first wavelength selective switches is connected to at least one of the Y wavelength add/drop modules by using optical fiber.

18. The optical switching device according to claim 16, wherein:

the Y wavelength add/drop modules further comprise a third wavelength add/drop module; and among the Q first wavelength selective switches, a quantity of first wavelength selective switches connected to the first wavelength add/drop module is equal to a quantity of first wavelength selective switches connected to the third wavelength add/drop module.

19. The optical switching device according to claim 17, wherein a quantity of wavelength add/drop modules connected to each of the Q first wavelength selective switches is the same.

20. The optical switching device according to claim 12, wherein:

one first port is disposed on a first side of each of the first wavelength selective switches, and K second ports are disposed on a second side of each of the first wavelength selective switches, wherein K is an integer greater than 1;

M third ports are disposed on a first side of the first wavelength add/drop module, and N fourth ports are disposed on a second side of the first wavelength add/drop module, wherein both M and N are positive integers greater than 1;

A third ports in the first wavelength add/drop module are connected to second ports of the A first wavelength selective switches among the P first wavelength selective switches by using the first one or more of the optical fibers, and connected to second ports of the Q first wavelength selective switches by using the second one or more of the optical fibers; and the first port is configured to input or output signals, and the N fourth ports are configured to add or drop signals.

* * * * *